United States Patent [19]

Hirs

[11] Patent Number: 5,112,485
[45] Date of Patent: May 12, 1992

[54] DRUM FILTER

[76] Inventor: Gene Hirs, 6865 Meadowlake Dr., Birmingham, Mich. 48010

[21] Appl. No.: 656,517

[22] Filed: Feb. 19, 1991

[51] Int. Cl.$^5$ .............................................. B01D 33/044
[52] U.S. Cl. ................................ 210/387; 210/123; 210/400; 210/402
[58] Field of Search ................ 210/123, 402, 400, 387

[56] References Cited

U.S. PATENT DOCUMENTS

| | | | |
|---|---|---|---|
| 3,359,709 | 12/1967 | Revell | 210/387 |
| 3,437,210 | 4/1969 | O'Neil | 210/387 |
| 3,581,896 | 6/1971 | Kuhlman | 210/387 |
| 4,686,042 | 8/1987 | Eckardt | 210/387 |
| 4,919,825 | 4/1990 | Croket | 210/387 |

Primary Examiner—Peter Hruskoci
Assistant Examiner—Robert James Popovics
Attorney, Agent, or Firm—Lyon & Delevie

[57] ABSTRACT

An automatic drum filter comprises a tank having a drum therein with a continuous filter media wrapped around substantially the entire periphery thereof. A supply roll of said media is supported externally of the tank for rotation about an axis substantially parallel to the axis of the drum. Filter media is advanced about the drum of the filter by means of an assembly which engages, advances, and then disengages the media.

5 Claims, 2 Drawing Sheets

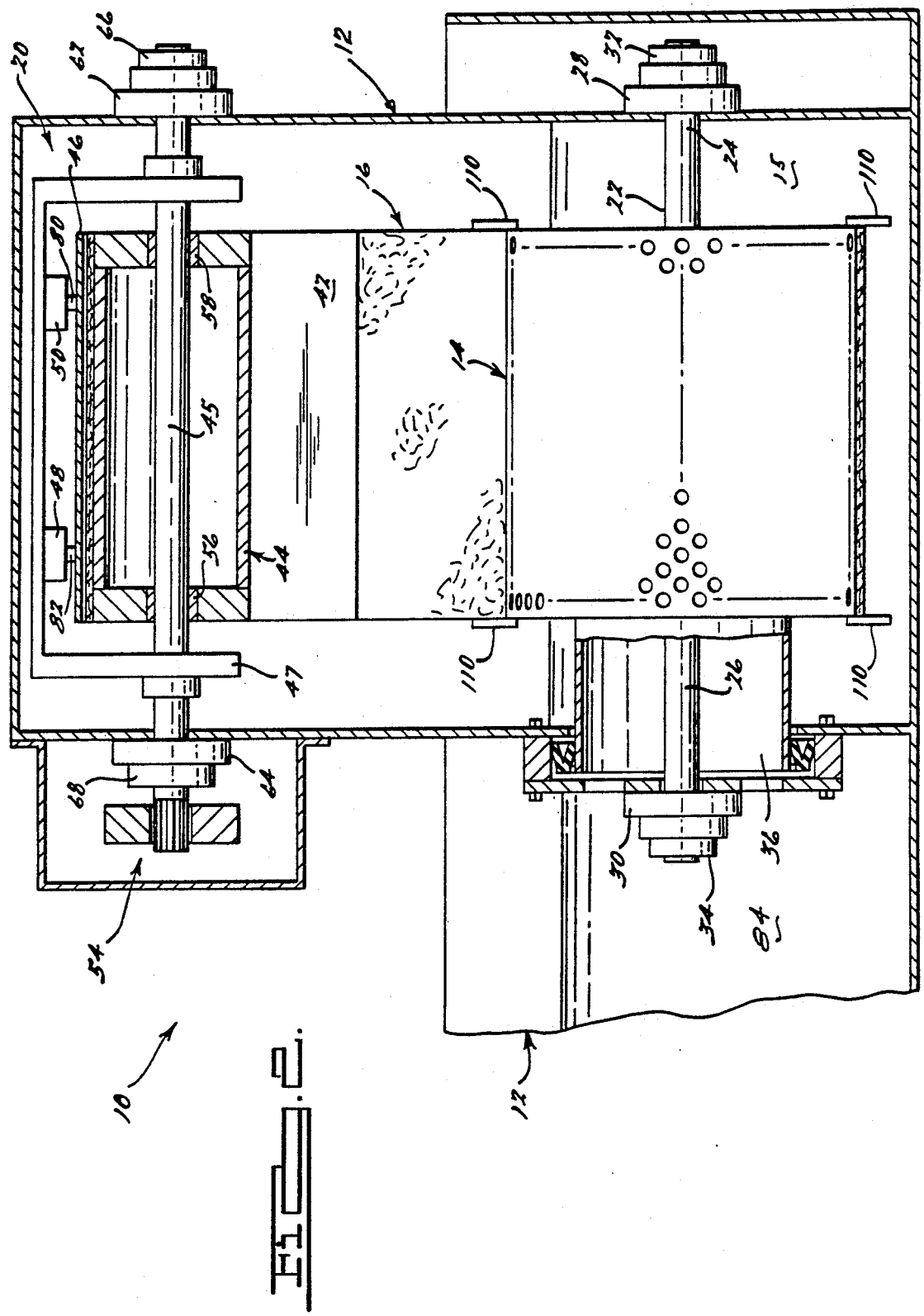

DRUM FILTER

BACKGROUND OF THE INVENTION

Drum filters are often used to filter the wash fluid at the rinse and wash stage of a phosphate line in an automobile assembly plant. Such drum filters generally comprise a perforate drum encircled by a renewable filter media. Fluid flows from the outside of the drum through the filter media to the inside of the drum. Discharge of the fluid from the inside of the drum is effected by passing the liquid through the center of a tubular discharge shaft. The filter media generally comprises non-woven fibers such as "DACRON," nylon, "ORLON," etc.

One problem inherent in all drum filters heretofore known and used is the difficulty of applying fresh filter media to the periphery of the filter drum, rotating the drum to effect advancement of the media, and removal of the wet clogged filter media from the drum.

Another aspect of the problem relates to a means for retaining the media on the drum while rotating the drum. For example, rotation of the drum and the media by a chain drive often caused tearing and bunching of the filter media. Pulling the media through the filter by rerolling the media has the inherent disadvantage of requiring careful tension and speed control of the drum. Stated in another manner, no fully satisfactory solution to the problems of applying the filter media to the drum, rotation of the drum and concomittant advancement of the media, and handling of the wet, soiled filter media has been presented heretofore.

SUMMARY OF THE INVENTION

The drum filter of the instant invention features a media application and removal system that automatically applies, advances, and then disposes of the filter media. The media application portion of the system comprises a media roll disposed exteriorly of the fluid tank. Media is fed over an applicator roll onto the surface of the filter drum.

The media advancement portion of the system comprises an idler drum, a support shaft for said drum, a clamp support yoke keyed to the support shaft, a pair of pneumatic clamp cylinders supported by said yoke, an arcuate pressure plate controlled by said clamp cylinders, and an air driven rotary actuator. The idler drum rotates freely on its support shaft. The filter media is compressed between the pressure plate and the idler drum when the clamp cylinders are pressurized. The filter drum is rotated and the filter media is advanced when the rotary actuator rotates the shaft, the yoke, the air cylinders, the pressure plate, and the idler drum as a unit. After rotation through a predetermined arc, the clamp cylinders are depressurized thereby disengaging the pressure plate from the filter media. Thereafter, the rotary actuator returns the yoke and air cylinder assembly to its original position. Clamp pressure and rotation of the pressure plate-idler drum unit is achieved by controlling the rate and sequence of pressurization of the air cylinders and the rotary actuator.

The weight of the ejected media provides constant tension on the media disposed about the filter drum and prevents the idler drum from rotating backwardly when the filter media is released by the pressure plate.

The media advancement sequence is initiated by a float switch in the clean tank of the filter. When the filter media becomes contaminated, less fluid is filtered per unit time, and the level in the clean tank is lowered triggering the media advancement sequence. Advancement of the filter media replaces contaminated media with clean media and thereby increases the filtration rate and fluid level in the clean tank. The media may be advanced one sequence only, thereby replacing only a portion of the contaminated media, or the sequence may be repeated a predetermined number of times, thereby replacing all of the contaminated media on the filter drum each time the float switch initiates a media advancement sequence.

BRIEF DESCRIPTION OF THE DRAWINGS

FIG. 2 is a view taken generally along the line 2—2 of FIG. 1.

DETAILED DESCRIPTION OF THE PREFERRED EMBODIMENT OF THE INVENTION

Figure 1:
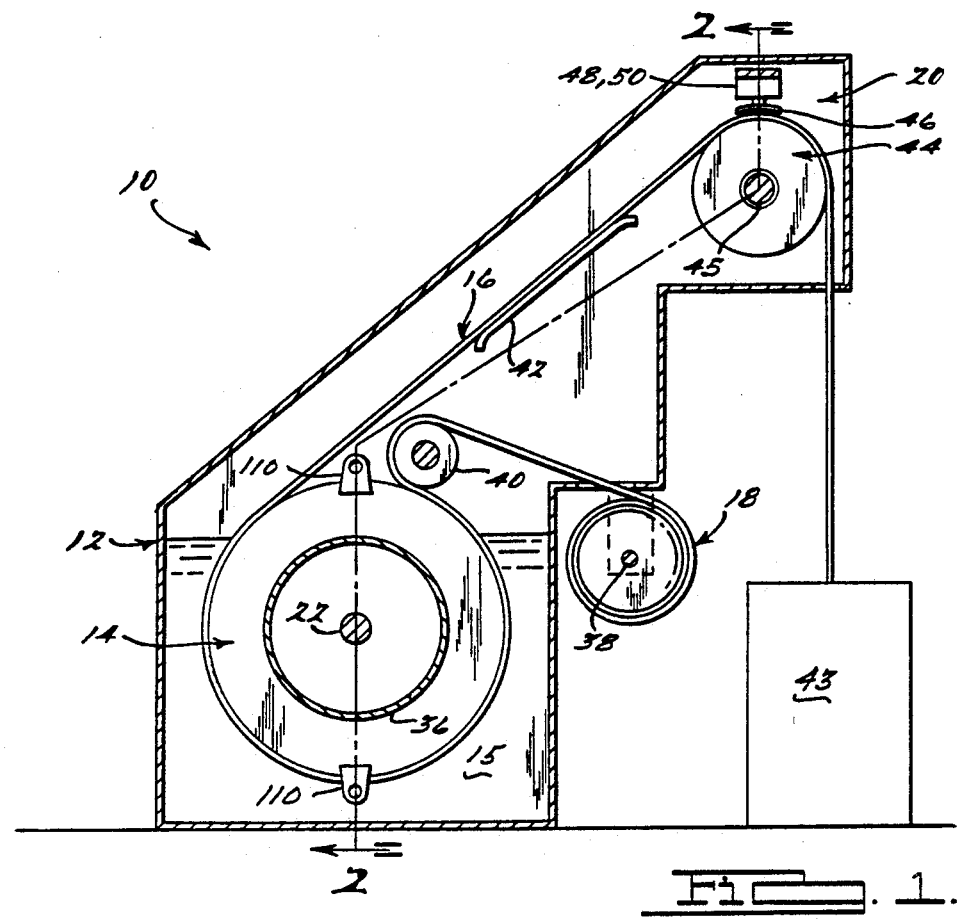
FIG. 1 is a side elevational view, partially in cross-section, of a drum filter in accordance with an exemplary constructed embodiment of the invention.

As seen in FIG. 1 of the drawings, a drum filter 10, in accordance with an exemplary constructed embodiment of the invention, comprises a tank 12 having a perforate drum 14 disposed in a contaminated fluid section 15 of the tank 12. A fibrous sheet type filter media 16 is disposed about the drum 14. The media 16 is pulled from a fresh media roll 18 and through the filter 10 by a media advancement assembly 20.

As seen in FIG. 2, the perforate drum 14 is supported on a shaft 22, ends 24 and 26 of which are journaled in bearings 28 and 30, respectively, so as to be freely rotatable under the bias of the media 16 upon tensioning thereof, as will be described. The bearings 28 and 30 are mounted on the sides of the tank 12. Collars 32 and 34 on both ends of the shaft 22 prevent longitudinal drift of the shaft 22. The filtered fluid flows from the interior of the drum 14 through an outlet port 36 of the drum 14.

The fresh media roll 18 is supported on a media roll shaft 38, that extends parallel to the filter drum shaft 22. The media 16 is fed from the roll 18, around an application roller 40, around the perforate drum 14, up a supporting ramp 42, through the drive assembly 20, thence discharged from the filter 10 into a refuse tank 43.

The drive assembly 20 comprises an idler drum 44, an idler drum support shaft 45, a clamp cylinder support yoke 47 keyed to said shaft 45, an arcuate pressure plate 46, two pneumatic clamp cylinders 48 and 50 supported by said yoke 47, and a pneumatic rotary actuator 54. The idler drum 44 rotates freely on the support shaft 45 on bushings 56 and 58. Energization of the air cylinders 48 and 50 effects advancement of the pressure plate 46 and compression of the filter media 16 between the pressure plate 56 and the idler drum 44. The face of the pressure plate 46 that contacts the media 16 is preferably lined with, for example, rubber, to prelude tearing of the media 16.

The shaft 45 is journaled in bearings 62 and 64 which are mounted on the walls of the tank 12. Two collars 66 and 68 prevent longitudinal drift of the shaft 52. Therefore, rotation of the shaft 45 under the control of the pneumatic actuator 54 effects rotation of the yoke 47.

The pneumatic rotary actuator 54 comprises two racks 70 and 72, a pinion 74, and two pneumatic cylinders 76 and 78. When the cylinders 76 and 78 are pressurized, the racks 70 and 72 are advanced effecting rotation of the pinion 74 and the shaft 52, causing rotation of the yoke 47, pressure plate 46, idler drum 44, and, therefore, advancement of the media 16 and rotation of the filter drum 14.

Figure 3:
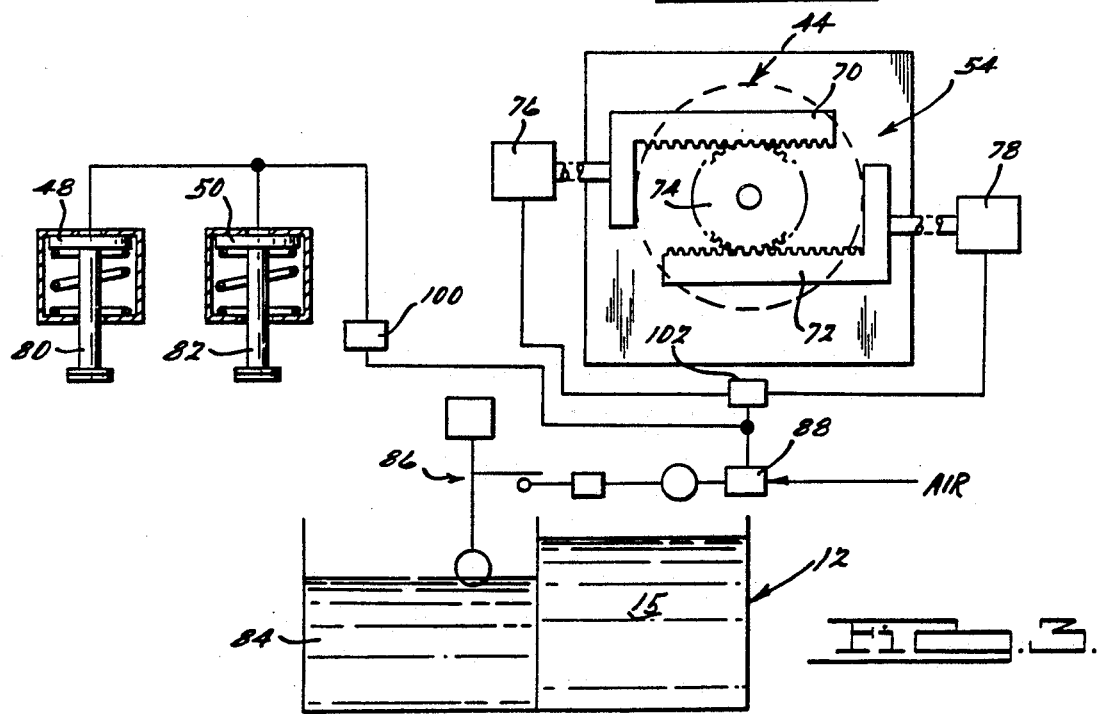
FIG. 3 is a diagram of the air and electrical circuits for controlling the air cylinders and rotary actuator of the filter.

As seen in FIG. 3, the drive assembly 20 is activated when the level of filtered fluid in a clean tank 84 falls below a designated level and closes a float switch 86. The float switch 86 energizes a solenoid valve 88 to which supplies compressed air to cylinders 48, 50, 76, and 78. Check valves 100 and 102 control the sequence and rate at which the clamp cylinders 48 and 50 and cylinders 76 and 78 of the pneumatic rotary actuator 54 are pressurized, respectively.

It is to be noted that the geometry of the filter 10 is such that the media 16 covers substantially the entire periphery of the filter drum 14. Moreover, the media 16 is removed tangentially from the filter drum 14 upon tensioning of the media 16 by the advancement assembly 20 thereby to minimize tearing of the wet media.

Another feature is the provision of axially aligned ears 110 at each end of the filter drum 14 for the acceptance of a media starter rod, not shown. To initially feed the media 16 about the drum 14 a rod is placed in an axially aligned pair of ears 110 thereby to clamp the free end of the media 16. After the media 16 is carried completely around the filter drum 14, the rod is removed.

While the preferred embodiment of the invention has been disclosed, it should be appreciated that the invention is susceptible to modification without departing from the scope of the following claims.

I claim:

1. An automatic drum filter comprising
   a tank having a contaminated fluid section and a clean fluid section,
   a perforate right cylindrical filter drum in the contaminated fluid section of said tank and supported for rotation about its central longitudinal axis thereof,
   means for withdrawing filtered fluid from the interior of said drum to the clean fluid section of said tank,
   a continuous filter media having a portion wrapped substantially around the entire periphery of said filter drum,
   a supply roll of said media supported externally of said tank for rotation about an axis substantially parallel to the axis of said drum,
   an idler drum supported on a shaft for free rotation about an axis substantially parallel to the axis of said filter drum,
   a pressure plate,
   means for mounting said pressure plate in spaced relation to said idler drum for the acceptance of contaminated media therebetween,
   means for advancing said pressure plate toward said idler drum to clamp said media therebetween, and
   means for effecting rotation of said pressure plate and said idler drum, so as to effect advancement of said media and rotation of said filter drum.

2. A filter in accordance with claim 1 wherein said mounting means comprises a U-shaped yoke having spaced leg portions keyed to the idler drum shaft and a bight portion for the support of said pressure plate.

3. A filter in accordance with claim 1 wherein the weight of wet media tensions the media on said filter drum and on said idler drum in the direction of media advancement after release from said idler drum.

4. A filter in accordance with claim 1 wherein the means for advancing the pressure plate comprises a fluid actuator.

5. A filter in accordance with claim 1 wherein the means for effecting rotation of the idler drum comprises a fluid actuator.

* * * * *